Figure 1:
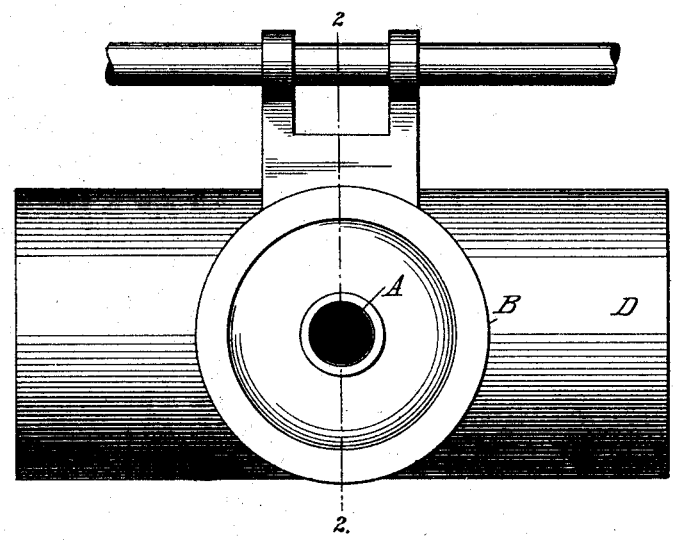

(No Model.)

J. H. WHITE.
PHONOGRAPH.

No. 504,380. Patented Sept. 5, 1893.

on line 2-2.

Witnesses
Raymond H. Barnes
F. S. Elmon

Inventor
J. H. White
By Phil T. Lodge
Attorney

UNITED STATES PATENT OFFICE.

JOHN H. WHITE, OF WASHINGTON, DISTRICT OF COLUMBIA.

PHONOGRAPH.

SPECIFICATION forming part of Letters Patent No. 504,380, dated September 5, 1893.

Application filed November 23, 1891. Serial No. 412,811. (No model.)

*To all whom it may concern:*

Be it known that I, JOHN H. WHITE, of Washington, in the District of Columbia, have invented a new and useful Improvement in Phonographs, of which the following is a specification.

My invention has reference to that class of instruments for recording and reproducing sounds in which a vibratory, peripherally-sustained diaphragm is used in connection with a recording or reproducing style or both. Heretofore these diaphragms have ordinarily consisted of a single thickness of iron, aluminium, glass or similar material. Practical experience has shown that each of these materials is attended in use by certain advantages and disadvantages. Now, the aim of my invention is to render the advantageous qualities available, and at the same time, to avoid the objectionable or disadvantageous qualities, and to this end I employ a laminated diaphragm, that is to say, a diaphragm composed of two or more sheets or layers throughout its operative portion, the sheets being constructed preferably of different materials, and preferably cemented together. In this way I am enabled to combine the strength of one material with the resonant qualities of another, and to prevent the diaphragm from losing its flat shape under changes of temperature, the one material so modifying or affecting the action of the other that the instrument will record or reproduce the sounds with great accuracy.

My laminated diaphragm may be used in connection with the Edison phonograph or either of its forms, or with the Tainter graphophone, or with any equivalent form of instrument. The diaphragm may be mounted in any suitable manner, and used in connection with recording or reproducing styles attached directly thereto or connected therewith through intermediate levers or other devices, such as commonly known in the art. I have, therefore, considered it sufficient to illustrate in the drawings, the diaphragm, its supporting-frame, a style, and a record cylinder.

Figure 2:
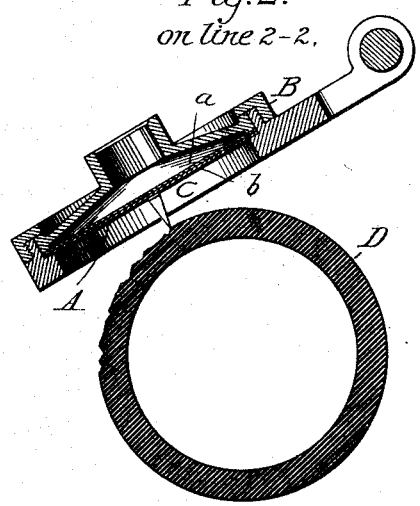

In the accompanying drawings,—Figure 1 is a top plan view of said parts. Fig. 2 is a vertical cross-section on the line 2—2.

Referring to the drawings, A represents the diaphragm, and B, the encircling-frame by which it is peripherally sustained; C, the style connected to the diaphragm and D, the record cylinder, the general organization and operation of the parts being the same as in existing machines.

The diaphragm as represented consists throughout its diameter of two sheets, plates or layers $a$ and $b$, laid flatwise one upon the other, and both confined and sustained at the periphery in the frame in the same manner that the ordinary diaphragms are supported. The sheets $a$ and $b$ may be constructed respectively of mica and glass, glass and aluminium, or of other materials differing in nature from each other, provided only that they are adapted to respond freely to and vibrate under the atmospheric impulses or the influence of the reproducing style, as the case may be. I find that the best results are attained when the laminæ are cemented tightly together throughout their opposing surfaces. The most satisfactory results are obtained when the diaphragm is composed of but two sheets or laminæ but it is to be understood that my invention contemplates the use of three, four or more sheets. When glass is combined with metal, both sheets being as thin as practice will permit, I am enabled to unite the strength of the metal with the resonant qualities of the glass, to keep the diaphragm in flat form and avoid that buckling and twisting which commonly result from changes of temperature when the diaphragm consists of a single metallic sheet. When combined as above described the two laminæ exert each a modifying influence on the action of the other.

I am aware that a diaphragm has been given an increased thickness at the center by cementing together a series of sheets successively diminishing in diameter, the outer or marginal portion of the diaphragm consisting, however, of a single sheet, and this construction is foreign to my invention.

Having thus described my invention, what I claim is—

1. In a phonograph, and in combination with a recording or reproducing style, a diaphragm composed of a plurality of sheets of substantially the same size laid one against the other.

2. A phonograph diaphragm composed of a sheet of metal and a sheet of glass in close contact with each other, and having their adjacent surfaces cemented together.

3. In a phonograph the combination with the style and cylinder of a diaphragm composed of sheets of metal and glass in close contact with each other, and a supporting frame for the diaphragm.

4. A phonograph diaphragm composed of alternate sheets of metal and glass in close contact with each other and secured together.

5. A phonograph diaphragm composed of a sheet of glass and a sheet of non-vitreous material in close contact with each other.

6. A phonograph diaphragm composed of a sheet of glass and a sheet of metal connected together.

In testimony whereof I hereunto set my hand, this 31st day of October, 1891, in the presence of two attesting witnesses.

JNO. H. WHITE.

Witnesses:
W. R. KENNEDY,
F. S. ELMORE.